US012644624B2

(12) United States Patent (10) Patent No.: US 12,644,624 B2

Greetham (45) Date of Patent: Jun. 2, 2026

(54) RESISTIVE LIQUID HEATER

(71) Applicant: Dyson Technology Limited, Wiltshire (GB)

(72) Inventor: Stephen Greetham, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 784 days.

(21) Appl. No.: 18/009,653

(22) PCT Filed: Jun. 16, 2021

(86) PCT No.: PCT/GB2021/051511

§ 371 (c)(1),
(2) Date: Dec. 9, 2022

(87) PCT Pub. No.: WO2022/003315

PCT Pub. Date: Jan. 6, 2022

(65) Prior Publication Data

US 2023/0243552 A1 Aug. 3, 2023

(30) Foreign Application Priority Data

Jun. 30, 2020 (GB) ..................................... 2009997

(51) Int. Cl.
*F24H 1/10* (2022.01)
*G05D 23/19* (2006.01)
(Continued)

(52) U.S. Cl.
CPC ............. *F24H 1/106* (2013.01); *G05D 23/19* (2013.01); *H05B 1/0244* (2013.01);
(Continued)

(58) Field of Classification Search
None
See application file for complete search history.

(56) References Cited

U.S. PATENT DOCUMENTS

| 4,953,536 A | 9/1990 | Israelsohn et al. | |
| 2005/0013595 A1* | 1/2005 | Israelson | ............... F24H 15/281 |
| | | | 392/449 |

(Continued)

FOREIGN PATENT DOCUMENTS

| CA | 1291785 C | 11/1991 |
| CN | 110521280 A | 11/2019 |

(Continued)

OTHER PUBLICATIONS

International Search Report and Written Opinion received for PCT Patent Application No. PCT/GB2021/051510, mailed on Sep. 20, 2021, 13 pages.

(Continued)

*Primary Examiner* — John J Norton
(74) *Attorney, Agent, or Firm* — Tucker Ellis LLP; Michael G. Craig

(57) ABSTRACT

A liquid heater is described including a chamber for receiving a liquid, pairs of electrodes located within the chamber for applying electric current to the liquid, input terminals for connection to a power supply, a plurality of bridge arms connected in parallel to the input terminals, and a control unit for controlling switches of the bridge arms. The plurality of bridge arms includes a respective bridge arm for each pair of electrodes and a common bridge arm, and each bridge arm includes a pair of switches and a node located between the switches. A first electrode of each pair of electrodes is connected to the node of the respective bridge arm, and a second electrode is connected to the node of the common bridge arm. The switches have a plurality of different states for selectively connecting pairs of electrodes to the input terminals in one of a plurality of electrode configurations, the electrodes having a different total electrical resistance in each electrode configuration.

15 Claims, 8 Drawing Sheets

(51) Int. Cl.
  *H05B 1/02* (2006.01)
  *H05B 3/00* (2006.01)
(52) U.S. Cl.
  CPC ......... *H05B 3/0004* (2013.01); *H05B 3/0023* (2013.01); *F24H 2250/10* (2013.01); *H05B 2203/021* (2013.01)

(56) References Cited

U.S. PATENT DOCUMENTS

| | | | | |
|---|---|---|---|---|
| 2006/0291527 | A1* | 12/2006 | Callahan | F24H 1/106 373/108 |
| 2010/0074602 | A1* | 3/2010 | Israelsohn | F24H 15/215 392/314 |
| 2010/0322605 | A1* | 12/2010 | van Aken | F24H 15/175 392/466 |
| 2011/0008026 | A1 | 1/2011 | Campbell | |
| 2019/0271487 | A1* | 9/2019 | Callahan | F24H 15/37 |
| 2020/0008272 | A1 | 1/2020 | Suga et al. | |
| 2020/0205237 | A1* | 6/2020 | Dietschi | H05B 3/0023 |
| 2021/0153302 | A1* | 5/2021 | Wieckowski | H05B 3/60 |
| 2023/0221037 | A1 | 7/2023 | Greetham | |
| 2023/0337334 | A1 | 10/2023 | Greetham | |

FOREIGN PATENT DOCUMENTS

| | | | |
|---|---|---|---|
| EP | 2765363 | A2 | 8/2014 |
| JP | 2006-050941 | A | 2/2006 |
| JP | 2013-167733 | A | 8/2013 |
| JP | 2020-516046 | A | 5/2020 |
| WO | 2006/119440 | A2 | 11/2006 |
| WO | 2009/100486 | A1 | 8/2009 |
| WO | 2018/085773 | A1 | 5/2018 |
| WO | 2018/184914 | A1 | 10/2018 |
| WO | 2019/199427 | A1 | 10/2019 |
| ZA | 884526 | B | 3/1989 |

OTHER PUBLICATIONS

International Search Report and Written Opinion received for PCT Patent Application No. PCT/GB2021/051511, mailed on Sep. 20, 2021, 12 pages.
International Search Report and Written Opinion received for PCT Patent Application No. PCT/GB2021/051512, mailed on Sep. 20, 2021, 11 pages.
Search Report received for GB Application No. 2009997.4, mailed on Dec. 10, 2022, 1 page.
Search Report received for GB Application No. 2009996.6, mailed on Dec. 11, 2022, 1 page.
Search Report received for GB Application No. 2009999.0, mailed on Dec. 10, 2022, 1 page.
Office Action received for Japanese Patent Application No. 2022-580502, mailed on Nov. 14, 2023, 4 pages (2 pages of English Translation and 2 pages of Original Document).

\* cited by examiner

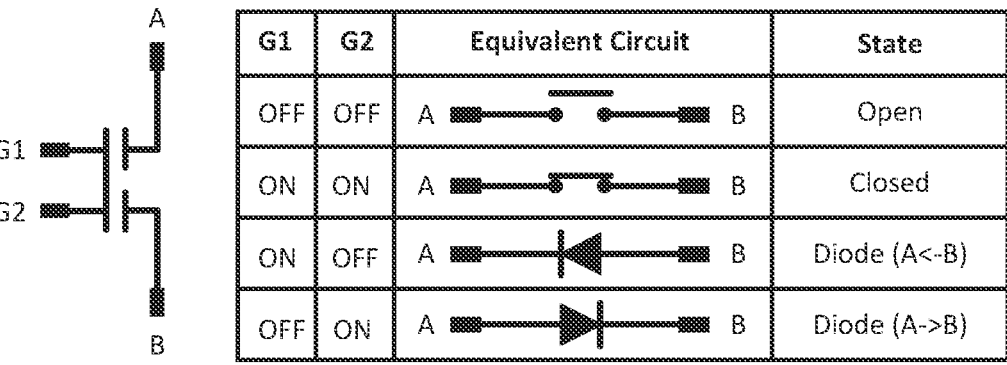

| G1 | G2 | Equivalent Circuit | State |
|----|----|----|----|
| OFF | OFF | A ▬▬▬━━●    ●━━▬▬ B | Open |
| ON | ON | A ▬▬▬━━●━━●━━▬▬ B | Closed |
| ON | OFF | A ▬▬━━◀━━▬▬ B | Diode (A<-B) |
| OFF | ON | A ▬▬━━▶━━▬▬ B | Diode (A->B) |

Fig. 3

| Energisation State | Switches Closed | Electrode Configuration | Applied Voltage |
|----|----|----|----|
| 1 | S1, S8 | E1 | $+V_{ac}$ |
| 2 | S2, S7 | E1 | $-V_{ac}$ |
| 3 | S3, S8 | E2 | $+V_{ac}$ |
| 4 | S4, S7 | E2 | $-V_{ac}$ |
| 5 | S5, S8 | E3 | $+V_{ac}$ |
| 6 | S6, S7 | E3 | $-V_{ac}$ |
| 7 | S1, S3, S8 | E1//E2 | $+V_{ac}$ |
| 8 | S2, S4, S7 | E1//E2 | $-V_{ac}$ |
| 9 | S1, S5, S8 | E1//E3 | $+V_{ac}$ |
| 10 | S2, S6, S7 | E1//E3 | $-V_{ac}$ |
| 11 | S3, S5, S8 | E2//E3 | $+V_{ac}$ |
| 12 | S4, S6, S7 | E2//E3 | $-V_{ac}$ |
| 13 | S1, S3, S5, S8 | E1//E2//E3 | $+V_{ac}$ |
| 14 | S2, S4, S6, S7 | E1//E2//E3 | $-V_{ac}$ |
| 15 | S1, S4, S6 | E1+(E2//E3) | $+V_{ac}$ |
| 16 | S2, S3, S5 | E1+(E2//E3) | $-V_{ac}$ |
| 17 | S2, S3, S6 | E2+(E1//E3) | $+V_{ac}$ |
| 18 | S1, S4, S5 | E2+(E1//E3) | $-V_{ac}$ |
| 19 | S2, S4, S5 | E3+(E1//E2) | $+V_{ac}$ |
| 20 | S1, S3, S6 | E3+(E1//E2) | $-V_{ac}$ |
| 21 | S1, S4 | E1+E2 | $+V_{ac}$ |
| 22 | S2, S3 | E1+E2 | $-V_{ac}$ |
| 23 | S1, S6 | E1+E3 | $+V_{ac}$ |
| 24 | S2, S5 | E1+E3 | $-V_{ac}$ |
| 25 | S3, S6 | E2+E3 | $+V_{ac}$ |
| 26 | S4, S5 | E2+E3 | $-V_{ac}$ |

Fig. 4

| Configuration Number | Electrode Configuration | Total Electrical Resistance (Ω) |
|---|---|---|
| 1 | E1//E2//E3 | 54 |
| 2 | E1//E2 | 58 |
| 3 | E1//E3 | 61 |
| 4 | E1 | 65 |
| 5 | E2//E3 | 333 |
| 6* | E1+(E2//E3) | 398 |
| 7 | E2 | 500 |
| 8* | E2+(E1//E3) | 561 |
| 9* | E1+E2 | 565 |
| 10 | E3 | 1000 |
| 11* | E3+(E1//E2) | 1058 |
| 12* | E1+E3 | 1065 |
| 13* | E2+E3 | 1500 |

Fig. 5

| Power Setting | Electrode Configuration | Total Electrical Resistance (Ω) | Electrodes Energised Every (N)th Half-Cycle | Electrical Input Power (W) |
|---|---|---|---|---|
| 1 | E1//E2//E3 | 54 | 1 | 980 |
| 2 | E2//E3//E3 | 58 | 1 | 912 |
| 3 | E1//E3 | 61 | 1 | 867 |
| 4 | E3 | 65 | 1 | 814 |
| 5 | E1//E2//E3 | 54 | 2 | 490 |
| 6 | E1//E2//E3 | 54 | 3 | 327 |
| 7 | E1//E2//E3 | 54 | 4 | 245 |
| 8 | E1//E2//E3 | 54 | 5 | 196 |
| 9 | E2//E3 | 333 | 1 | 159 |
| 10 | E1+(E2//E3) | 398 | 1 | 133 |
| 11 | E2 | 500 | 1 | 106 |
| 12 | E2+(E1//E3) | 561 | 1 | 94 |
| 13 | E2//E3 | 333 | 2 | 79 |
| 14 | E1+(E2//E3) | 398 | 2 | 66 |
| 15 | E3 | 1000 | 1 | 53 |
| 16 | E3+(E1//E2) | 1058 | 1 | 50 |
| 17 | E2+(E1//E3) | 561 | 2 | 47 |
| 18 | E1+(E2//E3) | 398 | 3 | 44 |
| 19 | E2//E3 | 333 | 4 | 40 |
| 20 | E2+E3 | 1500 | 1 | 35 |

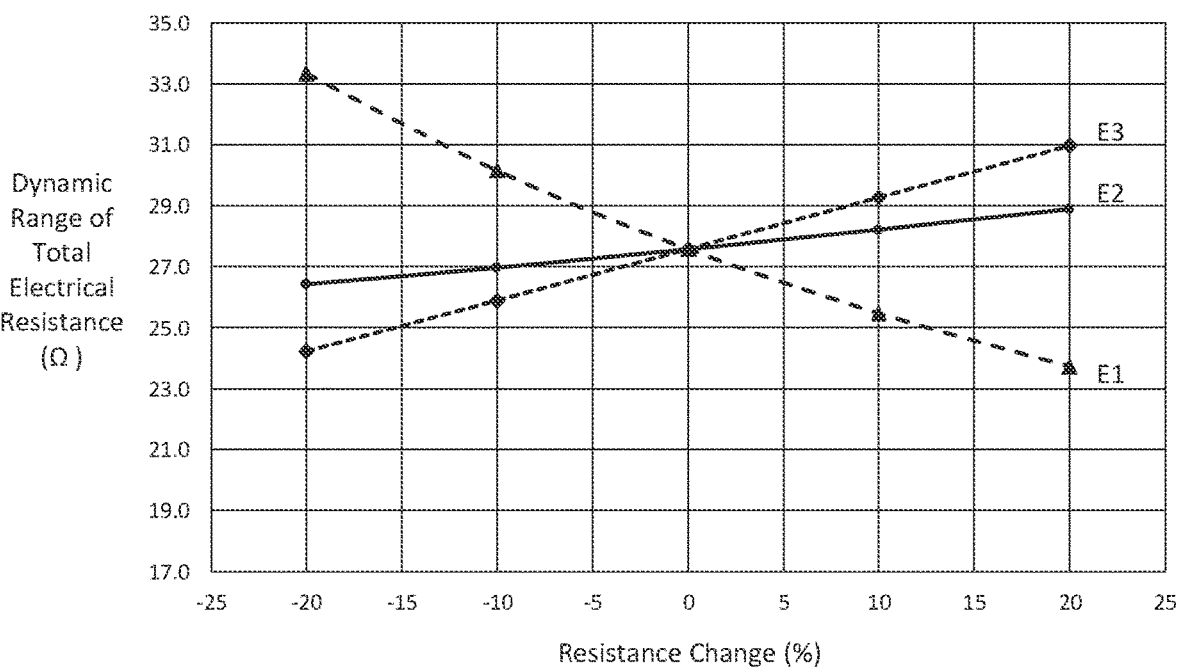
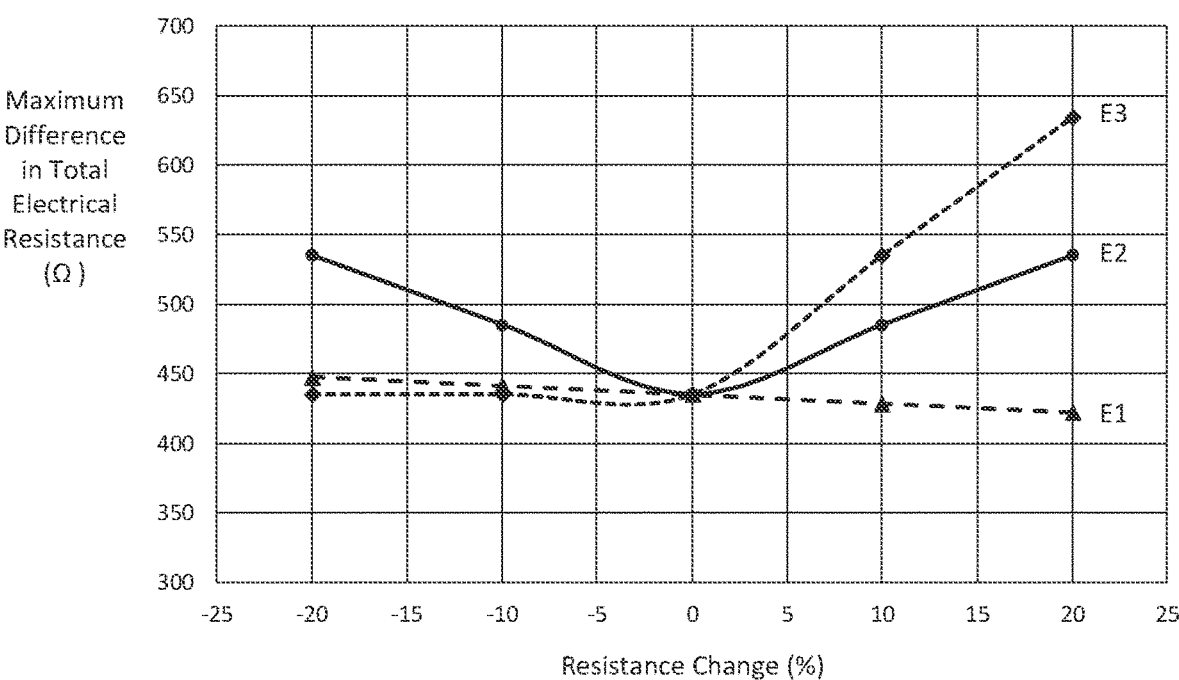
Fig. 9

Base Resistance (Ω)

| | | | | | | | |
|---|---|---|---|---|---|---|---|
| E1 | 250 | 125 | 90 | 65 | 65 | 65 | 65 |
| E2 | 350 | 350 | 350 | 500 | 600 | 750 | 950 |
| E3 | 550 | 650 | 750 | 1000 | 1200 | 1500 | 1900 |

Config.     Total Electrical Resistance (Ω)

| | | | | | | | |
|---|---|---|---|---|---|---|---|
| 1 | 115 | 81 | 65 | 54 | 56 | 58 | 59 |
| 2 | 146 | 92 | 72 | 58 | 59 | 60 | 61 |
| 3 | 172 | 105 | 80 | 61 | 62 | 62 | 63 |
| 4 | 214 | 125 | 90 | 65 | 65 | 65 | 65 |
| 5 | 250 | 228 | 239 | 333 | 400 | 500 | 633 |
| 6 | 350 | 350 | 329 | 398 | 465 | 565 | 698 |
| 7 | 464 | 353 | 350 | 500 | 600 | 750 | 950 |
| 8 | 522 | 455 | 430 | 561 | 662 | 812 | 1013 |
| 9 | 550 | 475 | 440 | 565 | 665 | 815 | 1015 |
| 10 | 600 | 650 | 750 | 1000 | 1200 | 1500 | 1900 |
| 11 | 696 | 742 | 822 | 1058 | 1259 | 1560 | 1961 |
| 12 | 800 | 775 | 840 | 1065 | 1265 | 1565 | 1965 |
| 13 | 900 | 1000 | 1100 | 1500 | 1800 | 2250 | 2850 |

| | | | | | | | |
|---|---|---|---|---|---|---|---|
| Dynamic Range | 7.8 | 12.4 | 16.8 | 27.8 | 32.2 | 39.1 | 48.4 |
| Max Difference | 114 | 225 | 310 | 435 | 535 | 685 | 885 |
| Average Difference | 65 | 77 | 86 | 121 | 145 | 183 | 233 |

Fig. 10

RESISTIVE LIQUID HEATER

CROSS-REFERENCE TO PRIOR APPLICATION

This application is a § 371 National Stage Application of PCT International Application No. PCT/GB2021/051511 filed Jun. 16, 2021, which claims the priority of United Kingdom Application No. 2009997.4, filed Jun. 30, 2020.

FIELD OF THE INVENTION

The present invention relates to a liquid heater that employs resistive heating to heat a liquid.

BACKGROUND OF THE INVENTION

A liquid heater may employ resistive heating, also referred to as Joule or Ohmic heating, to provide instantaneous or on-demand heating of a liquid. As the liquid passes through the heater, electrodes apply an electric current to the liquid, causing the liquid to heat.

SUMMARY OF THE INVENTION

The present invention provides a liquid heater comprising: a chamber for receiving a liquid; pairs of electrodes located within the chamber for applying electric current to the liquid; input terminals for connection to a power supply; a plurality of bridge arms connected in parallel to the input terminals, the plurality of bridge arms comprising a respective bridge arm for each pair of electrodes and a common bridge arm, each bridge arm comprising a pair of switches and a node located between the switches; and a control unit for controlling the switches, wherein: a first electrode of each pair of electrodes is connected to the node of the respective bridge arm; a second electrode of each pair of electrodes is connected to the node of the common bridge arm; and the switches have a plurality of different states for selectively connecting pairs of electrodes to the input terminals in one of a plurality of electrode configurations, the electrodes having a different total electrical resistance in each electrode configuration.

By providing a common bridge arm in this way, the number of possible electrode configurations is increased. As a result, improved control over the heating of the liquid may be achieved. For example, by having additional electrode configurations, each of which has a different total electrical resistance, a higher thermal fidelity may be achieved. Additionally, a relatively wide range for the total electrical resistance may be achieved whilst ensuring that the difference in total electrical resistance between two ranked electrode configurations is not excessive.

Two ranked electrode configurations should be understood to mean two consecutive electrode configurations when ranked for total electrical resistance.

The heater may be used to heat a liquid having a wide range of conductivities. By having a larger number of different electrode configurations, the heating of such liquids may be better controlled. For example, an electrode configuration may be selected according to the conductivity of the liquid such that the same or similar level of heating may be achieved irrespective of the conductivity.

The liquid heater may comprise at least three pairs of electrodes. As a result, the heater has at least thirteen possible electrode configurations. The liquid heater is therefore capable of achieving a given range for the total electrical resistance using a smaller average and/or maximum difference in the total electrical resistance between two ranked electrode configurations. As a result, relatively good thermal fidelity may be achieved in the temperature of the liquid by virtue of the smaller difference in total electrical resistance between each pair of ranked electrode configurations.

Each pair of electrodes has a different electrical resistance. As a result, a greater number of electrode configurations are possible for which the total electrical resistance is different, and thus finer thermal control may be achieved.

The electrical resistances of the pairs of electrodes may have a maximum of Rmax and a minimum of Rmin, where Rmax/Rmin is at least 10. As a result, a relatively wide dynamic range in the total electrical resistance of the various electrode configurations may be achieved.

The total electrical resistances of the electrode configurations may have a minimum of RTmin and a maximum of RTmax. Additionally, a difference in the total electrical resistances of any two ranked electrode configurations may have a maximum of Rmaxdiff. RTmax/RTmin may then be at least 20 and Rmaxdiff/(RTmax–RTmin) may be no greater than 35%. This then provides a relatively good balance between dynamic range (RTmax/RTmin) and resolution (Rmaxdiff) in the total electrical resistance. In particular, the heater has a dynamic range of at least 20, whilst ensuring that the difference in total electrical resistance between any two ranked configurations is no greater than 35% of the total range.

The control unit may control the switches such that the electrodes are energised with an alternating voltage within each configuration. As a result, electrolysis of the electrodes may be avoided.

The switches may have a first state in which the electrodes are energised with a positive voltage and a second state in which the electrodes are energised with a negative voltage. The control unit may switch the switches between the first state and the second state at a switching frequency of at least 300 kHz. As a result, the electrodes are energised with an alternating voltage having a frequency of at least 150 kHz. By energising the electrodes at such high frequencies, smaller electrodes may be used to deliver the same electrical power without electrolysis occurring. Accordingly, a higher power density may be achieved for the heater.

The power supply may supply an alternating voltage, and the control unit may control the switches such that, within at least one setting, the electrodes are energised only during each Nth half-cycle of the alternating voltage, where N is at least 2. As a result, a higher thermal fidelity may be achieved. For example, the control unit may comprise a first setting in which the electrodes are energised during each second half-cycle (N=2), rather than each and every half-cycle of the alternating voltage. As a result, the electrical input power for that electrode configuration will be halved. Similarly, the control unit may comprise a second setting in which the electrodes are energised during every third half-cycle (N=3). As a result, the electrical input power for that electrode configuration will be one third. A wider range of electrical input powers, and thus a wider range of heating rates, are therefore possible.

The power supply may supply an alternating voltage, and the control unit may control the switches such that, within at least one setting, the electrodes are energised during one or more portions only of each half-cycle of the alternating voltage. As a result, a higher thermal fidelity may be achieved. In particular, by energising the electrodes during portions only of each half-cycle, a lower electrical input power may be achieved. Furthermore, adjustments to the electrical input power may be made by varying the sizes or lengths of the portions.

The liquid heater may comprise a temperature sensor for sensing a temperature of the liquid, and the control unit may control the switches so as to select an electrode configuration based on the temperature of the liquid and a temperature setpoint. In particular, the control unit may select an electrode configuration having a lower total electrical resistance in response to a larger difference between the temperature of the liquid and the temperature setpoint. As a result, good thermal control may be achieved. For example, where the difference between the temperature of the liquid and the setpoint is large, the control unit may select an electrode configuration having a lower total electrical resistance. Conversely, where the difference between the temperature of the liquid and the setpoint is small, the control unit may select an electrode configuration having a higher total electrical resistance. As a result, quick and yet precise heating of the liquid may be achieved.

The liquid heater may comprise a temperature sensor for sensing a temperature of the liquid, and the control unit may control the switches such that the electrodes are energised with a voltage having a duty defined by the temperature of the liquid and the temperature setpoint. By energising the electrodes with a voltage have a variable duty, finer control over the temperature of the liquid may be achieved. In particular, varying the duty may be used to achieve an electrical input power that lies between that of two electrode configurations. Consequently, a higher thermal fidelity may be achieved.

The control unit may control the switches such that the electrodes are energised with a voltage having a variable duty no less than 70%. As noted in the preceding paragraph, the duty may be varied so as to achieve a higher thermal fidelity. Additionally or alternatively, when switching between electrode configurations, the electrodes of the configuration having the lower total electrical resistance may be energised with a voltage having a lower duty. Consequently, when switching between the electrode configurations, harmonics introduced into the current drawn from the power supply may be reduced and thus a filter of smaller impedance may be used. Energising the electrodes with a voltage having a duty less than 100% introduces a period during which no voltage is applied to the electrodes, and thus no current is drawn by the electrodes from the power supply. However, by ensuring that the duty is no less than 70%, relatively good control over heating may be achieved using a filter of relatively low impedance.

The power supply may supply an alternating voltage, and the switches may be bi-directional switches. This then has the advantage that, irrespective of the polarity of the power supply, the electrodes may be energised with an alternating voltage. Moreover, the electrodes may be energised with an alternating voltage having a frequency higher than that of the supply voltage without the need to provide an AC-to-DC stage or a PFC circuit.

The power supply may supply an alternating voltage having a first frequency, and the control unit may control the switches such that the electrodes are energised with an alternating voltage having a second higher frequency. As a result, electrolysis may be avoided in spite of the lower frequency of the supply voltage. The first frequency may be no greater than 60 Hz and second frequency may be no less than 150 kHz. Accordingly, a heater having smaller electrodes may be powered by a mains power supply (which typically has a frequency of 50 Hz or 60 Hz) and yet electrolysis may be avoided by energising at frequencies in excess of 150 kHz.

BRIEF DESCRIPTION OF THE DRAWINGS

Embodiments will now be described, by way of example, with reference to the accompanying drawings in which:

FIG. 3 illustrates possible states for each switch of the heater;

FIG. 4 is a table detailing various energisation states in which electrodes of the heater are energised in different configurations;

FIG. 5 is a table detailing the total electrical resistance for each electrode configuration of the heater;

FIG. 9 illustrates how changes to the base resistances of the electrodes of the heater influence the dynamic range (upper graph) and the maximum difference in total electrical resistance between two electrode configurations (lower graph); and FIG. 10 is a table detailing the total electrical resistances, the dynamic range, and the maximum and average difference in total electrical resistance between two electrode configurations for electrodes having different base resistances.

DETAILED DESCRIPTION OF THE INVENTION

Figure 1:
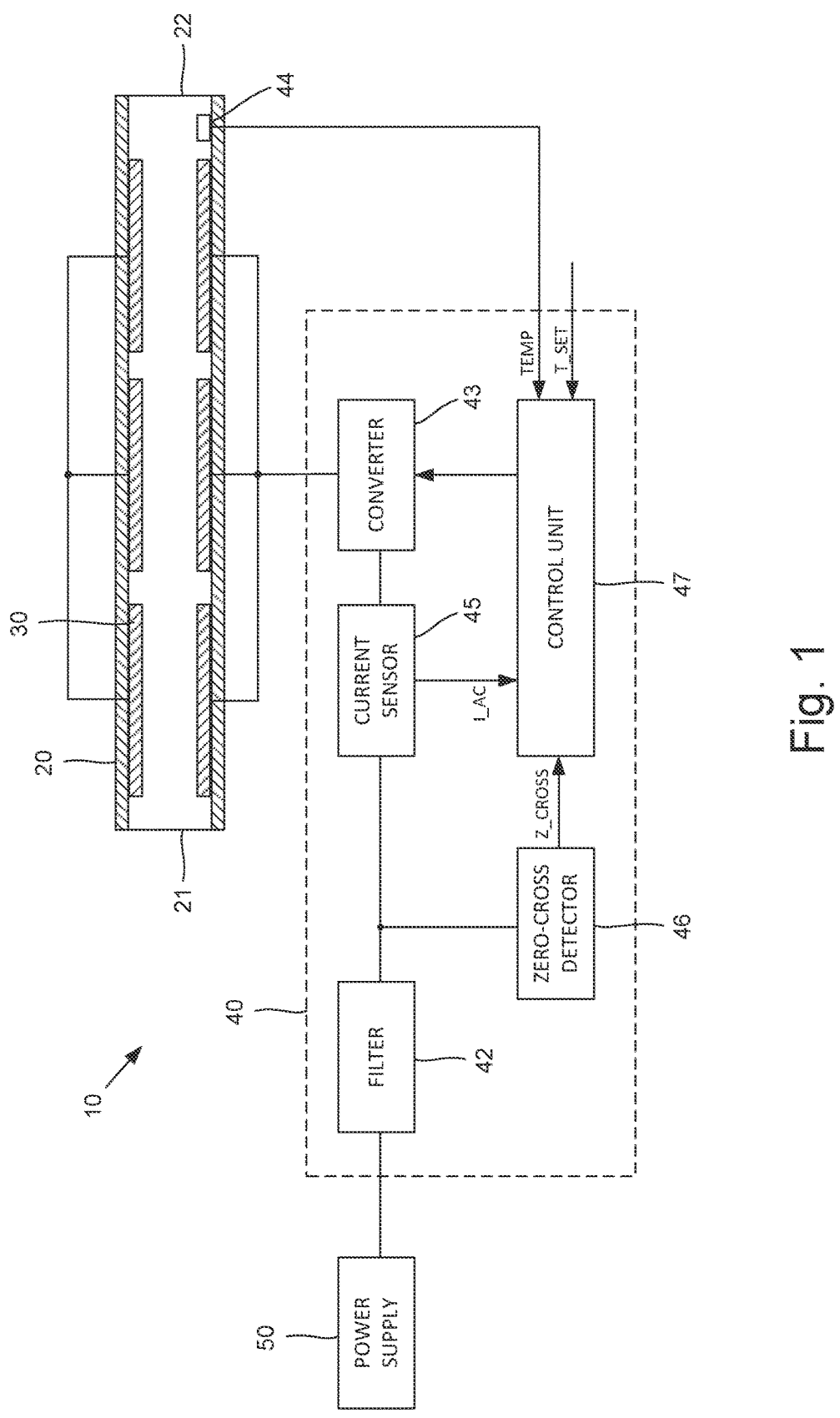
FIG. 1 is a block diagram of a liquid heater.
Figure 2:
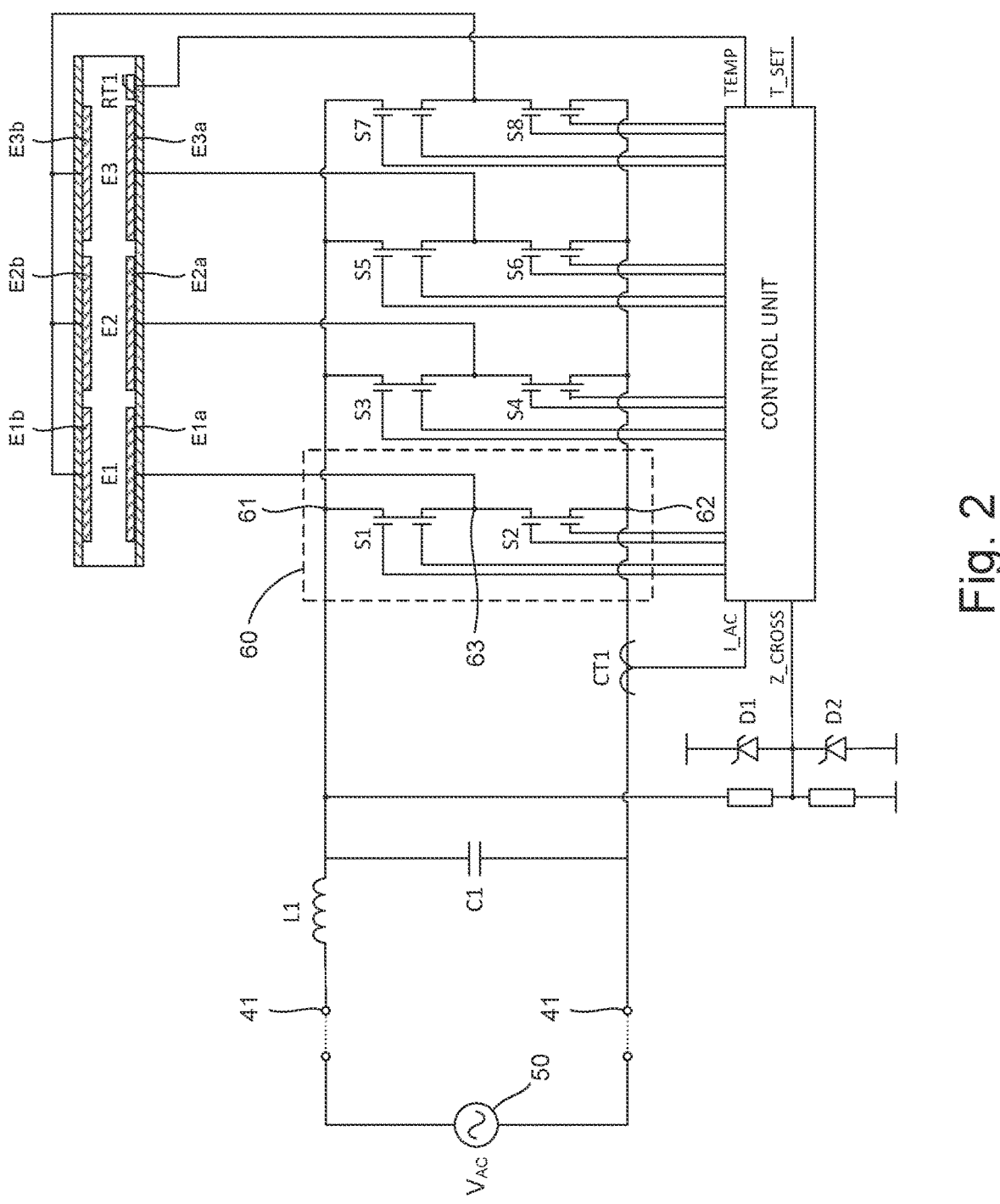
FIG. 2 is a circuit diagram of the heater.

The liquid heater 10 of FIGS. 1 and 2 comprises a chamber 20, electrodes 30, and a control system 40.

The chamber 20 receives a liquid to be heated and comprises an inlet 21 and an outlet 22 through which the liquid enters and leaves the chamber 20.

The electrodes 30 comprise three pairs of electrodes E1-E3 located within the chamber 20. Each pair of electrodes 30 defines a channel through which the liquid passes as it flows from the inlet 21 to the outlet 22 of the chamber 20. The first pair of electrodes E1 are located upstream of the second pair of electrodes E2, which in turn are located upstream of the third pair of electrodes E3. Consequently, the liquid first passes between the electrodes of the first pair E1, followed by the second pair E2, before finally passing between the electrodes of the third pair E3.

Each pair of electrodes 30 has a different electrical resistance, which is to say that when the chamber 20 is filled with liquid, the electrical resistance across one pair of electrodes (e.g. E1) will differ from that of the other two pairs of electrodes (e.g. E2 and E3). Different electrical resistances may be achieved by having electrodes of different cross-sectional area and/or separation distances.

The control system 40 comprises input terminals 41, a filter 42, a converter 43, a temperature sensor 44, a current sensor 45, a zero-cross detector 46, and a control unit 47.

The input terminals 41 are connectable to a power supply 50, such as a mains power supply, that supplies an alternating voltage.

The filter 42 comprises an inductor L1 and a capacitor C1, which attenuate high-frequency harmonics in the current drawn from the power supply 50.

The converter 43 comprises a plurality of bridge arms 60 connected in parallel across the input terminals 41. Accordingly, each bridge arm 60 may be said to comprise a first end 61 connected to one of the input terminals 41, and a second end 62 connected to the other of the input terminals 41. Each bridge arm 60 comprises a pair of switches Sn (e.g. S1 and S2) and a node 63 located between the two switches.

The switches Sn of each bridge arm 60 are bi-directional. As illustrated in FIG. 3, each switch Sn has four possible states: (1) open, in which the switch does not conduct in either direction; (2) closed, in which the switch conducts in both directions; (3) diode mode #1, in which the switch conducts in one direction only (e.g. B→A); and (4) diode mode #2, in which the switch conducts in the other direction only (e.g. A→B). Each switch Sn can therefore be controlled in both directions, which is to say that each switch can be made conductive and non-conductive in one or both directions. The switches Sn thus differ from, say, a MOSFET having a body diode or IGBT having an anti-parallel diode which, although capable of conducting in both directions, can be made non-conductive in one direction only. The switches Sn are gallium nitride switches, which have a relatively high breakdown voltage and are thus well-suited for operation at mains voltages. Additionally, gallium nitride switches are capable of relatively high switching frequencies, the advantages of which are detailed below. Nevertheless, other types of bi-directional switch that are capable of being controlled in both directions might alternatively be used.

The converter 43 comprises a respective bridge arm (e.g. S1 and S2) for each pair of electrodes (e.g. E1), and a common bridge arm (e.g. S7 and S8) that is common to all pairs of electrodes 30. In this particular embodiment the heater 10 comprises three pairs of electrodes 30 and thus the converter 43 comprises four bridge arms 60 in total.

For each pair of electrodes (e.g. E1), a first electrode (e.g. E1*a*) is connected to the node 63 of its respective bridge arm (e.g. S1 and S2), and a second electrode (e.g. E1*b*) is connected to the node 63 of the common bridge arm (e.g. S7 and S8). Consequently, the converter 43 and electrodes 30 resemble a three-phase, four-wire Y-connected system.

The switches Sn have a plurality of different states for selectively energising (i.e. applying a voltage to) one or more pairs of electrodes E1-E3.

FIG. 4 details the various states of the switches Sn for energising different electrode configurations. In FIG. 4 '//' refers to a parallel connection and '+' refers to a series connection. So, for example, the electrode configuration '(E1//E2)+E3' should be understood to mean that the first pair of electrodes E1 and the second pair of electrodes E2 are connected in parallel, and that this parallel grouping is then connected in series with the third pair of electrodes E3.

It can be seen in FIG. 4 that there are two states for energising the electrodes of each electrode configuration: one in which a positive voltage is applied to the electrodes, and another in which a negative voltage is applied to the electrodes. The polarities of the applied voltage in FIG. 4 are based on a positive supply voltage on the upper line of the converter 43; the polarities will, of course, be reversed should the supply voltage on the upper line be negative.

A positive voltage may be said to be applied to a pair of electrodes (e.g. E1) if the voltage applied to the first electrode (e.g. E1*a*) is positive. Accordingly, in FIG. 4, the polarity of the applied voltage refers to that applied to the first of the listed electrode pairs, as well as any electrode pairs connected in parallel to the first-listed pair. The voltage applied to an electrode pair connected in series with the first-listed pair will, however, have the opposite polarity. Accordingly, where reference is made to energising selected pairs of electrodes, it should be understood that the electrode pairs may be energised with voltages of the same or opposite polarity.

There are thirteen different electrode configurations listed in the table of FIG. 4. Each electrode configuration has a different total electrical resistance. FIG. 5 details the total electrical resistance for each electrode configuration. The total electrical resistances of FIG. 5 are based on base electrical resistances of 65Ω for the first pair of electrodes E1, 500Ω for the second pair E2, and 1000Ω for the third pair E3. Whilst reference is made herein to electrodes having a particular base electrical resistance or to an electrode configuration having a particular total electrical resistance, it should be understood that the electrical resistance arises from the liquid between the electrodes and that the electrodes themselves have a relatively low (ideally zero) electrical resistance.

When the electrodes 30 of a selected configuration are energised, the electrical input power, which is dissipated in the liquid as heat, depends upon the total electrical resistance of the electrode configuration. More particularly, for a given supply voltage (e.g. RMS voltage), the electrical input power is inversely proportional to the total electrical resistance of the electrode configuration. Accordingly, by selecting an electrode configuration of lower electrical resistance, a higher electrical input power is drawn from the power supply 50 and thus a higher level of heating may be achieved.

The temperature sensor 44 senses the temperature of the liquid at the outlet 22 of the chamber 20 and outputs a signal, TEMP, to the control unit 47. In this particular example, the temperature sensor 44 comprises a thermistor RT1.

The current sensor 45 senses the current drawn from the power supply 50 and outputs a signal, LAC, to the control unit 47. In this particular example, the current sensor 45 comprises a current transducer CT1, such as a current transformer or Hall-effect sensor.

The zero-cross detector 46 senses zero-crossings in the voltage $V_{AC}$ of the power supply 50 and outputs a signal, Z_CROSS, to the control unit 47. In this particular example, the zero-cross detector 46 comprises a pair of clamping diodes D1,D2.

The control unit 47 is responsible for controlling the operation of the heater 10. The control unit 47 receives a setpoint temperature T_SET, as well as the signals output by the temperature sensor 44, the current sensor 45, and the zero-cross detector 46. In response, the control unit 47 outputs control signals to the converter 43 for controlling the state of the switches Sn.

The control unit 47 selects an electrode configuration based on the temperature of the liquid and the temperature setpoint. The control unit 47 then outputs control signals to the converter 43 so as to energise the electrodes in accordance with the selected electrode configuration. There are various control algorithms which the control unit 47 may employ in order to select an electrode configuration. In one example, the control unit 47 may initially select an electrode configuration based solely on the setpoint temperature, T_SET. If the temperature of the liquid, TEMP, subsequently exceeds the setpoint temperature or settles at a value below the setpoint temperature, the control unit 47 may then select a different electrode configuration based on the temperature difference. In another example, the control unit 47 may select an electrode configuration based on the temperature of the liquid (or the temperature setpoint) and the temperature difference between the temperature of the liquid and the temperature setpoint. As a result, the control unit 47 selects an electrode configuration having a total electrical resistance that depends not only on the temperature difference between the liquid and the setpoint, but also on the starting (or finishing) temperature of the liquid. In another example, the control unit 47 may use a form of PID control or other feedback mechanism in order to select an electrode configuration based on the temperature of the liquid and the temperature setpoint.

As noted above, there are two energisation states for each electrode configuration: one in which a positive voltage $+V_{AC}$ is applied to the electrodes 30, and another in which a negative voltage $-V_{AC}$ is applied to the electrodes 30. When energising the electrodes 30 of each electrode configuration, the control unit 47 switches between these two energisation states such that the electrodes 30 are energised with an alternating voltage. Moreover, the control unit 47 switches between states with a switching frequency of at least 300 kHz. As a result, the electrodes 30 are energised with an alternating voltage of at least 150 kHz; this is much higher than the frequency of the power supply 50, which for a mains power supply is typically 50 Hz or 60 Hz. By energising the electrodes 30 with an alternating voltage of such high frequency, the liquid may be heated using smaller electrodes without electrolysis occurring, as will now be explained.

For each electrode (e.g. E1$a$), a double-layer capacitance is produced at the interface between the electrode and the liquid. The capacitance of this double layer varies a function of the material and the surface area of the electrode. For a given electrode material, the capacitance decreases as the surface area decreases, owing to the smaller contact area with the liquid. The voltage across the double-layer capacitance is a function of both the capacitance of the double layer and the frequency of the applied voltage. Accordingly, as the size of the electrode decreases, and thus the capacitance decreases, the voltage across the electrode increases. When the voltage across the electrode exceeds the decomposition potential of the liquid, electrolysis occurs. It is generally thought that electrolysis does not occur when electrodes are energised at frequencies of 50 Hz or 60 Hz, i.e. at frequencies of a mains power supply. Indeed this is true through appropriate sizing of the electrodes. However, by energising the electrodes at much higher frequencies (e.g. at least 300 kHz), much smaller electrodes may be used to deliver the same heating power to the liquid. Accordingly, a more power dense heater 10 may be realised.

The switches Sn are bi-directional switches. As a result, an alternating voltage may be applied to the electrodes 30 irrespective of the polarity of the supply voltage $V_{AC}$. The switches are gallium nitride switches, which are not only capable of operating at these relatively high switching frequencies (i.e. at least 300 kHz), but have relatively low switching losses at these frequencies.

Figure 6:
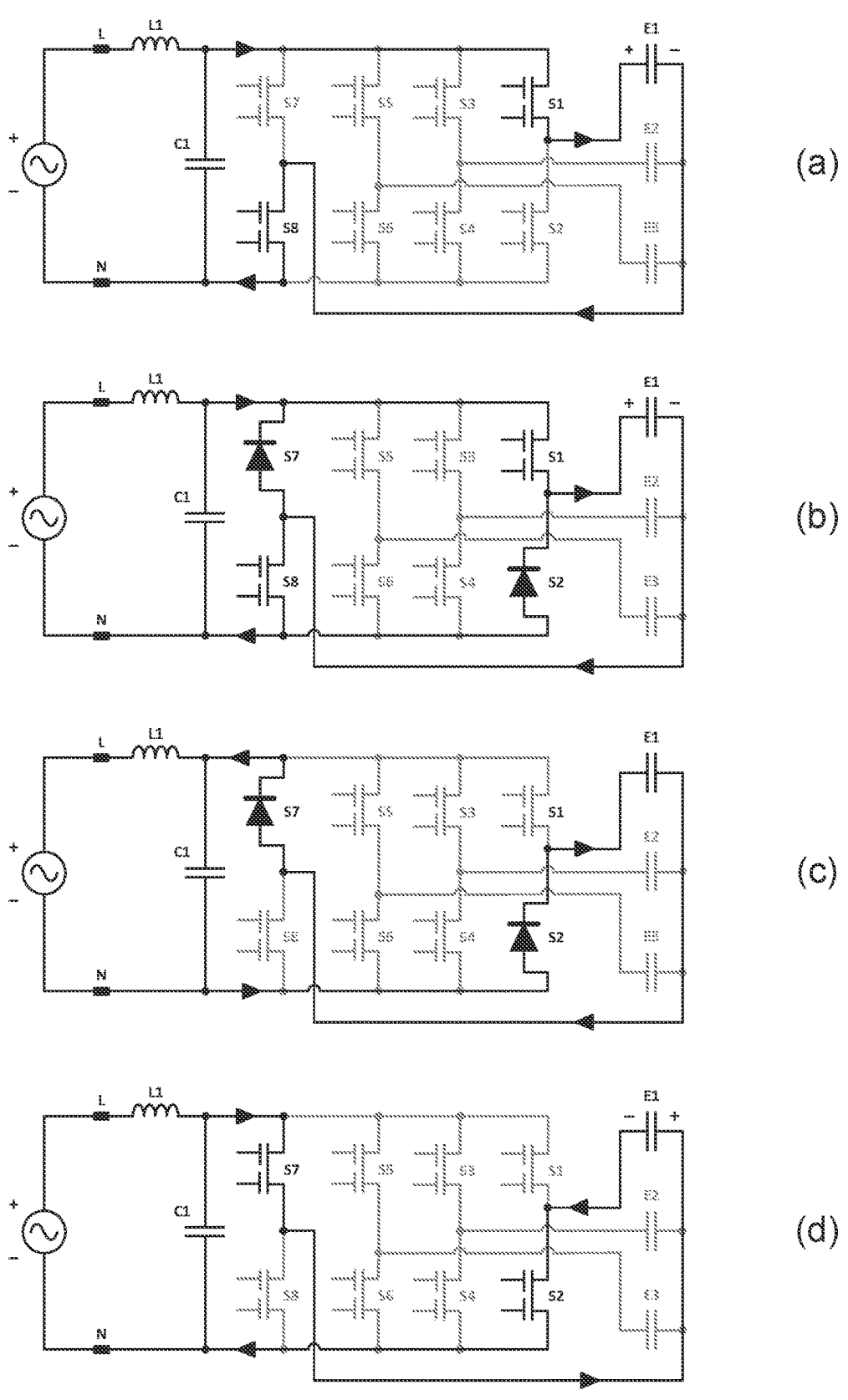
FIG. 6 illustrates the sequence of state transitions of the switches of the heater when switching between energisation states 1 and 2 of FIG. 4.

When switching between energisation states within each electrode configuration or when switching between two electrode configurations, the control unit 47 controls the states of the switches Sn so as to avoid shoot-through whilst also providing a path for any inductive current. FIG. 6 illustrates the sequence of state transitions when switching between energisation states 1 and 2 of FIG. 4. The sequence begins in FIG. 6($a$) with switches S1 and S8 closed such that a positive voltage is applied to the first electrode pair E1.

The sequence moves to FIG. 6($b$) in which switches S1 and S8 continue to be closed such that a positive voltage continues to be applied to the electrode pair E1. However, switches S2 and S7 are now put into diode mode. More particularly, G1 is turned ON and G2 is turned OFF such that both switches S2,S7 conduct in the direction shown in FIG. 6($b$). The sequence moves to FIG. 6($c$) in which switches S1 and S8 are opened. At this point, no voltage is applied to the electrode pair E1 (i.e. the electrodes are no longer energised). S2 and S7 continue to be in diode mode are provide a path for inductive current to flow, as indicated by the arrows in FIG. 6($c$). The sequence ends in FIG. 6($d$) in which switches S2 and S7 are closed such that a negative voltage is applied to the electrode pair E1.

In the example illustrated in FIG. 6, there is a period, often referred to as dead time, during which no current is drawn from the power supply 50. In the example of FIG. 6, this occurs when the switches Sn are in the state illustrated in FIG. 6($c$). This dead time, which is relatively short in duration, introduces a relatively high-frequency ripple in the current drawn from the power supply 50. The filter 42 then attenuates this high-frequency ripple. Owing to the relatively short duration of the dead time, the filter 42 is able to attenuate the high-frequency ripple using components (e.g. LI and CI) of relatively low impedance, thus reducing the size and cost of the control system 40.

When switching between two electrode configurations, there may be a significant change in the total electrical resistance. This may be true even when switching between two adjacent electrode configurations ranked for total electrical resistance. For example, in the table of FIG. 5, the maximum difference in total electrical resistance between any two adjacently-ranked electrode configurations is 435Q (which occurs when switching between configurations 9 and 10, and between configurations 12 and 13). Switching between two electrode configurations may therefore introduce significant harmonics into the current drawn from the power supply 50. The control unit 47 therefore switches between two electrode configurations at zero-crossings in the supply voltage VAC, as sensed by the zero-cross detector 46. By changing electrode configurations when the voltage of the power supply 50 is at or near zero, the harmonic content arising from the abrupt change in the total electrical resistance of the electrodes 30 may be significantly reduced. As a result, changes to the electrode configuration may be achieved without any significant increase in the impedance of the filter 42. Conceivably, the control unit 47 may change electrode configurations at any time and the resulting harmonics may be attenuated by the filter 42. However, this would then require a significant increase in the impedance of the filter 42. As a further alternative, when changing between two electrode configurations, the control unit 47 may energise the electrodes 30 with a voltage having a duty less than 100%; this is described below in more detail.

The heater 10 has thirteen different electrode configurations, each having a different total electrical resistance. By having a relatively large number of electrode configurations, each of which provides a different electrical input power, a relatively high thermal fidelity may be achieved. Additionally, by having a large number of electrode configurations, a relatively wide dynamic range in total electrical resistance (and thus in electrical input power) may be achieved, whilst ensuring that the average and/or maximum difference in total electrical resistance between two ranked electrode configurations is not excessive. For example, with the resistances of FIG. 5, the total electrical resistance of the electrodes 30 ranges from 54Q to 1500Q, which corresponds to a dynamic range of 28:1. However, the average and maximum differences in total electrical resistance are respectively 121Q and 435Q, which correspond to 8% and 30% of the total range.

The large number of electrode configurations is made possible through the provision of the common bridge arm (e.g. S7 and S8). Without the common bridge arm, the heater 10 would have just six different configurations; these are indicated with a * in FIG. 5. In addition to a fewer number of electrode configurations, the dynamic range would decrease significantly without the common bridge arm. In particular, with the resistances of FIG. 5, the dynamic range would decrease from 28:1 (i.e. 54Ω to 1500Ω) to just 4:1 (398Ω to 1500Ω). Furthermore, the average and maximum differences in total electrical resistance between any two adjacently-ranked electrode configurations would increase respectively from 121Ω to 220Ω and from 435Ω to 493Ω. By providing just two additional switches, the total number of electrodes configurations are more than doubled, the dynamic range is significantly increased, and the average and maximum differences in total electrical resistance between any two adjacently-ranked configurations may be reduced.

Figures 7, 8:
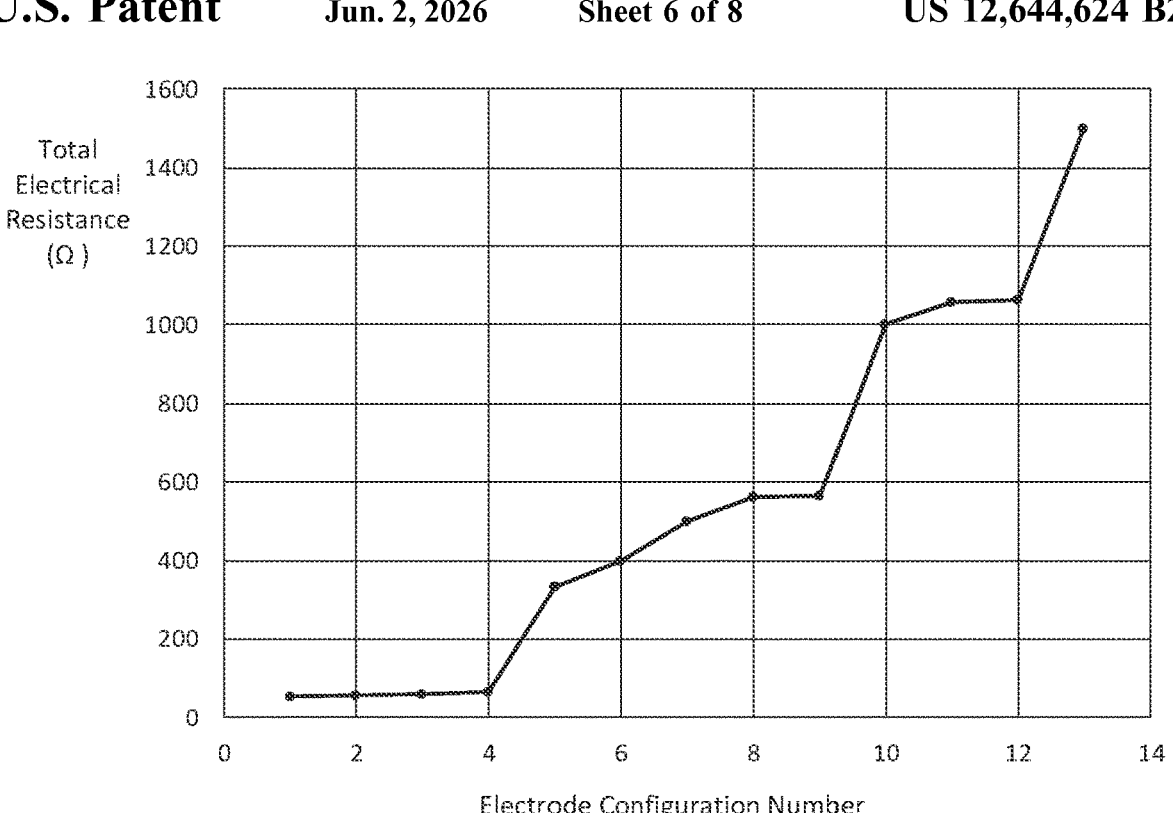
FIG. 7 is a graph illustrating the behaviour in the total electrical resistance for the electrode configurations of FIG. 5.
FIG. 8 details various power settings for the heater.

FIG. 7 illustrates the behaviour in the total electrical resistance for the various electrode configurations, using the values of FIG. 5. It can be seen that there is a significant change in the total electrical resistance between configurations 4 and 5 (268Ω), 9 and 10 (435Ω), and twelve and thirteen (435Ω). Considering just configurations 4 and 5, the total electrical resistance jumps from 65Ω to 333Ω. This represents a significant change in electrical input power. For example, if the supply voltage has an RMS value of 230 V, the electrical input power will change from 814 W in configuration 4 to 159 W in configuration 5. It may be desirable to heat the liquid at electrical input powers between these two values. This would then provide greater control (i.e. finer resolution/higher fidelity) over the temperature of the liquid.

One method for achieving alternative electrical input powers is to energise the electrodes 30 during every Nth half-cycle of the supply voltage, $V_{AC}$. For example, by energising the electrodes 30 during every second half-cycle, rather than every half-cycle of the supply voltage, the electrical input power for that particular electrode configuration will be halved. Accordingly, in order to obtain electrical input powers at values between that of electrode configurations 4 (814 W) and 5 (159 W), the control unit 47 may energise the electrodes of configuration number 1: (i) during every second half-cycle (N=2) in order to obtain an electrical input power of 490 W; (ii) during every third half-cycle (N=3) in order to obtain an electrical input power of 327 W; (iii) during every fourth half-cycle (N=4) in order to obtain an electrical input power of 245 W; and (iv) during every fifth half-cycle (N=5) in order to obtain an electrical input power of 196 W.

FIG. 8 details various power settings for the heater 10. For each power setting, the control unit 47 employs a particular electrode configuration and energises the electrodes 30 during every Nth half-cycle of the supply voltage, $V_{AC}$. The listed values for the electrical input power are based on an RMS value of 230 V for the supply voltage. It can be seen that, by selecting a different electrode configuration and by varying the length of energisation (i.e. by varying the value of N), a wide range of different electrical input powers are possible. In particular, rather than the input power jumping from 814 W (power setting 4) to 159 W (power setting 9) as was previously the case, the heater 10 is now capable of input powers of 490 W, 327 W, 245 W and 196 W (power settings 5 to 8).

Another method for achieving alternative electrical input powers is to energise the electrodes 30 during a portion(s) only of each half-cycle of the supply voltage, VAC. For example, following a zero-crossing in the supply voltage, the control unit 47 may wait for a period of time before energising the electrodes 30. The control unit 47 continues to energise the electrodes 30 until the next zero-crossing, after which the control unit 47 again waits for a period of time before energising the electrodes 30. By adjusting the period of time between a zero-crossing and the start of energisation, the control unit 47 is able to adjust the electrical input power. Controlling the energisation in this way is likely to increase the harmonic content within the current waveform. However, owing to the clipped shape of the current waveform, the greatest increase is likely to be in the low-order harmonics, for which regulations are typically more forgiving. Accordingly, the harmonics may be attenuated to levels that pass regulations with a modest increase in the impedance of the filter 42. In addition to delaying the start of energisation, the control unit 47 may stop energisation prior to the next zero-crossing. In particular, the control unit 47 may stop energisation prior to the next zero-crossing by the same period of time used to delay the start of energisation. As a result, the shape of the current waveform is more symmetric and thus the magnitude of the harmonics may be reduced. In a further example, the control unit 47 may energise the electrodes at the start and end of each half-cycle, and suspend energisation during the middle part of the half-cycle where the magnitude of the supply voltage is greatest. In so doing, a larger reduction in electrical input power may be achieved for a shorter suspension period in energisation. By suspending energisation for a shorter period, the harmonic content in the current waveform may be reduced. The control unit 47 may employ different patterns of energisation in order to achieve a given reduction in electrical input power whilst also minimising the magnitude of the current harmonics.

A further method for achieving alternative electrical input powers is to energise the electrodes 30 with a voltage having a variable duty. That is to say that the period of time during which the electrodes are energised may be less than 100% of the cycle time. For example, by energising the electrodes 30 with a voltage having a duty of, say, 70%, the electrical input power for that particular electrode con-figuration is approximately halved. Energising the electrodes 30 with a voltage having a duty less than 100% inevitably introduces a period during which no voltage is applied to the electrodes 30, and thus no current is drawn from the power supply 50. As a result, harmonics are introduced into the current waveform, which must then be filtered by the filter 42. As the duty of the applied voltage decreases, the magnitude of the harmonic content increases, and thus the required impedance of the filter 42 increases. Accordingly, the control system 47 may energise the electrodes 30 with a voltage having a duty no less than 70%. As a result, relatively good thermal control may be achieved with a filter 42 of relatively low impedance.

The control unit 47 may employ two or more of the methods described above in order to achieve different electrical input powers. For example, in FIG. 8, the electrical input power is 814 W for power setting 4, and 490 W for power setting 5. Again, it may be desirable to heat the liquid at electrical input powers between these two values. Accordingly, the control unit 47 may select power setting 4 and energise the electrodes 30 with a duty less than 100% in order to achieve an electrical input power between these two values. For example, by energising the electrodes 30 with a duty of 90% or 80%, electrical input powers of 659 W and 521 W may be achieved. In a further example, the control unit 47 may initially increase the duty in order to reduce the electrical input power within a particular electrode configuration. However, when the duty reaches 70%, the control unit 47 may employ a different energisation pattern (e.g. energise every Nth half-cycle or energise during a portion(s) only of each half-cycle) in order to achieve further reductions in the electrical input power. By employing a combination of different methods, a higher thermal fidelity may be achieved.

Conceivably, the heater 10 could employ a single electrode configuration having the lowest total electrical resistance (e.g. 54Q), and the control unit 47 could control the duty of the applied voltage in order to achieve all other values for the electrical input power. However, for the same range in electrical input power, the control unit 47 would need to employ a relatively large range in the duty. For example, in order to achieve the same range in electrical input power as that detailed in FIG. 8, the duty would need to vary from 100% (980 W) to 19% (35 W). However, a duty of 19% would require a filter of significant impedance. Instead, by switching between a number of different electrode configurations, changing the pattern of energisation (e.g. energise every Nth half-cycle or energise during a portion(s) only of each half-cycle), and energising the electrodes with a voltage having a variable duty that is no less than 70%, a similar level of thermal fidelity may be achieved with a filter 42 of lower impedance.

As noted above, when changing between two electrode configurations, there may be a significant change in the total electrical resistance. The control unit 47 therefore switches between electrode configurations only in response to zero-crossings in the supply voltage VAC. As a result, switching between electrode configurations may be achieved without requiring any significant increase in the impedance of the filter 42. Additionally or alternatively, the control unit 47 may vary the duty of the applied voltage so as to reduce the difference in electrical input power when switching between different electrode configurations. More particularly, when switching between a first electrode con-figuration having a higher total electrical resistance and a second electrode configuration having a lower total electrical resistance, the control unit 47 may energise the electrodes 30 of the second configuration with a voltage having a lower duty. As a result, the difference in electrical input power between the two electrode configurations is reduced. The harmonics introduced into the current upon switching between configurations may therefore be reduced and thus a filter 42 of smaller impedance may be used. That said, a filter of higher impedance will nevertheless be required in com-parison to the scheme in which the control unit 47 only switches between different configurations in response to zero-crossings in the supply voltage VAC. However, the increase in impedance may be relatively modest, the zero-cross detector 47 46 may be omitted, and the control unit 47 may switch between electrode configurations at any time.

FIG. 9 shows how adjustments to the base resistances of the electrode pairs of FIG. 5 influence the dynamic range (upper graph) and the maximum difference in total electrical resistance between two adjacently-ranked electrode configurations (lower graph). It can be seen that, at these values, the resistances of the first pair of electrodes E1 and the third pair of electrodes E3 have the biggest impact on the dynamic range. It can also be seen that the resistance of the first pair of electrodes E1 has little influence on the maximum difference. Moreover, any changes to the resistance of the second pair of electrodes E2, be it an increase or a decrease, will only serve to increase the peak difference. It has been found that a good balance between dynamic range and peak difference may be achieved by ensuring that the resistance of the second pair of electrodes E2 is around half of that of the third pair of electrodes E3, i.e. $0.45 \leq R2/R3 \leq 0.55$.

FIG. 10 shows the total electrical resistances for electrodes 30 having different base resistances. It can be seen that a relatively wide dynamic range (i.e. around 20:1 or greater) may be achieved by ensuring that the electrical resistance of the third pair of electrodes E3 is at least ten times that of the first pair of electrodes E1, i.e. R3/ R1 is at least 10.

With the heater described above, it is possible to achieve a relatively wide dynamic range whilst also ensuring that the difference in total electrical resistance between any two ranked configurations is not excessive. In particular, if the total electrical resistance of the electrode configurations has a minimum of RTmin and a maximum of RTmax, and if the difference in the total electrical resistances between any two ranked configurations has a maximum of Rmaxdiff, then it is possible to achieve an arrangement in which RTmax/ RTmin is at least 20 (i.e. the dynamic range is at least 20:1) and Rmaxdiff/(RTmax−RTmin) is no greater than 35% (i.e. the maximum difference between two ranked configurations is no greater than 35% of the dynamic range).

Not all possible permutations of electrode configurations are possible with the control system described above. In particular, it is not possible to configure the switches to achieve the following configurations: (E1+E2)//E3, (E1+E3)//E2, (E2+E3)//E1 and E1+E2+E3. Whilst additional configurations would be desirable, some of these absent configurations are likely to have total electrical resistances that are similar to existing configurations. For example, (E1+E2)//E3 is likely to have a similar total resistance value to E1//E3, and (E1+E3)//E2 is likely to have a similar total resistance to E1//E2. Conceivably, one or more of the absent configurations may be obtained by adding two or more additional switches to the converter. However, for the same number of switches, a far greater number of electrode configurations may be achieved by have four pairs of electrodes and five bridge arms. With this particular arrangement, the switches may be configured to selectively energise the electrodes in one of 36 possible electrode configurations.

The heater 10 may be required to heat liquids of different conductivities. For example, the conductivity of mains water can vary significantly from country to country, and even from region to region within the same country. The base resistance of each pair of electrodes E1-E3 and thus the total electrical resistance of each electrode configuration will depend on the conductivity of the liquid. In particular, for a liquid of lower conductivity, the total electrical resistance of each electrode configuration will be higher and thus the electrical input power will be lower. Conversely, for a liquid of higher conductivity, the total electrical resistance of each electrode configuration will be lower and thus the electrical input power will be higher. Accordingly, where the heater 10 is required to heat liquids of different conductivities, significant variations in the conductivity may make it difficult to achieve both quick and accurate heating of the liquid. The control unit 47 may therefore select a power setting or electrode configuration that is additionally based on the conductivity of the liquid in order to achieve better thermal control. There are various ways in which this might be achieved. For example, following installation of the heater 10, the control unit 47 may select a power setting (i.e. electrode configuration, energisation pattern, and/or a voltage duty) based on the setpoint temperature, T_SET. For a liquid of nominal conductivity, the selected power setting should cause the liquid to be heated to the setpoint temperature. However, if the temperature of the liquid, TEMP, exceeds the setpoint temperature or settles at a value below the setpoint temperature, the control unit 47 may adjust the power setting (e.g. a different electrode configuration, energisation pattern and/or voltage duty) until the setpoint temperature is reached. This adjustment to the power setting may then be stored by the control unit 47. When a different setpoint temperature is subsequently received, the control unit 47 may again select a power setting (based on a liquid of nominal conductivity) and then apply the stored adjustment to the selected power setting. This particular type of control is relatively simple and is well-suited for applications in which the conductivity of the liquid is constant but unknown (e.g. mains water supply). In another example, the control unit 47 may make use of the current sensor 45, which is primarily used by the control unit 47 to monitor and avoid excessive currents. For a given supply voltage, the current drawn by the heater 10 is directly proportional to the total electrical resistance of the electrode configuration. Accordingly, the control unit 47 may use the current measurement in order to make an indirect measure of the conductivity of the liquid. For example, the control unit 47 may select a power setting that is based both on the setpoint temperature and then adjust the power setting based on the magnitude of the current drawn from the power supply 50.

In the example described above, the heater 10 comprises three pairs of electrodes E1-E3. However, the heater 10 may comprise any number of pairs of electrodes. The converter 43 then comprises a respective bridge arm for each pair of electrodes, and a common bridge arm that is common to all pairs of electrodes.

As already noted, the provision of the common bridge has the advantages that it significantly increases the number of electrode configurations, as well as the dynamic range of the total electrical resistance. Nevertheless, in spite of these advantages, there may be applications for which it is not essential to have as many electrode configurations and/or a wide dynamic range. In this case, the common bridge could conceivably be omitted.

Within each electrode configuration, the control unit 47 controls the switches Sn of the converter 43 such that the electrodes 30 are energised with an alternating voltage having a frequency of at least 150 kHz. As already noted, by energising the electrodes 30 with an alternating voltage of such high frequency, the liquid may be heated using smaller electrodes without electrolysis occurring. Depending on the material and size of the electrodes, as well as the magnitude of the applied voltage, electrolysis may be avoided at lower frequencies. However, by energising the electrodes with an alternating voltage having a frequency of at least 150 kHz, a significant reduction in the size of the electrodes may be achieved at mains voltages.

The converter 43 comprises bi-directional switches. Additionally, the control unit controls the switches Sn such that the electrodes 30 are energised with non-continuous or unregulated electrical power. More particularly, the electrical input power drawn from the power supply 50 has a sine-squared waveform. As a result, the control system 40 operates as a direct AC/AC converter and is able to energise the electrodes 30 with a high-frequency alternating voltage without the need to rectify the supply voltage, or provide an AC-to-DC stage, active power factor correction, or energy storage.

The heater 10 described above is intended to be used with a power supply 50 that supplies an AC voltage. The heater 10 may, however, equally be used with a power supply 50 that supplies a DC voltage. The control unit 47 continues to control the switches Sn of the converter 43 such that the electrodes 30 of each configuration are energised with an alternating voltage. Accordingly, the converter 43 continues to include a respective bridge arm for each pair of electrodes. However, since the supply voltage is no longer alternating but instead of constant polarity, it is not necessary for the switches Sn to be bi-directional. Accordingly, the switches of the converter 43 may be conventional MOSFETs or IGBTs.

In the example described above, the control system 40 comprises a temperature sensor 44 which is used to sense the output temperature of the liquid. The control unit 47 then uses this temperature measurement to select or adjust the power setting or electrode configuration. As noted above, the control unit 47 may also use the output of the current sensor 45 to select or adjust the power setting or electrode configuration. The control system 40 may comprise additional sensors, which the control unit 47 may use to select or adjust the power setting or electrode configuration. For example, the control system 40 may comprise additional temperature sensors for measuring the temperature of the liquid at various points within the chamber, or a flow sensor for measuring the flow rate of the liquid moving through the chamber 20. Moreover, the control system 40 may comprise a flow valve or other means for controlling the flow rate of the liquid moving through the chamber 20.

Whilst particular embodiments have thus far been described, it will be understood that various modifications may be made without departing from the scope of the invention as defined by the claims.

The invention claimed is:

1. A liquid heater comprising:
a chamber for receiving a liquid;
pairs of electrodes located within the chamber for applying electric current to the liquid;
input terminals for connection to a power supply;
a plurality of bridge arms connected in parallel to the input terminals, the plurality of bridge arms comprising a respective bridge arm for each pair of electrodes and a common bridge arm, each bridge arm comprising a pair of switches and a node located between the switches; and
a control unit for controlling the switches,
wherein:
a first electrode of each pair of electrodes is connected to the node of the respective bridge arm;
a second electrode of each pair of electrodes is connected to the node of the common bridge arm; and
the switches have a plurality of different states for selectively connecting pairs of electrodes to the input terminals in one of a plurality of electrode configurations, the electrodes having a different total electrical resistance in each electrode configuration.

2. The liquid heater as claimed in claim 1, wherein the liquid heater comprises at least three pairs of electrodes.

3. The liquid heater as claimed in claim 1, wherein each pair of electrodes has a different electrical resistance.

4. The liquid heater as claimed in claim 1, wherein the electrical resistances of the pairs of electrodes have a maximum of Rmax and a minimum of Rmin, where Rmax/Rmin is at least 10.

5. The liquid heater as claimed in claim 1, wherein the total electrical resistances of the electrode configurations has a minimum of RTmin and a maximum of RTmax, and a difference in the total electrical resistances of any two ranked electrode configurations has a maximum of Rmaxdiff, where RTmax/RTmin is at least 20 and Rmaxdiff/ (RTmax−RTmin) is no greater than 35%.

6. The liquid heater as claimed in claim 1, wherein the control unit controls the switches such that the electrodes are energised with an alternating voltage within each configuration.

7. The liquid heater as claimed in claim 6, wherein the switches have a first state in which the electrodes are energised with a positive voltage and a second state in which the electrodes are energised with a negative voltage, and the control unit switches the switches between the first state and the second state at a switching frequency of at least 300 KHz.

8. The liquid heater as claimed in claim 1, wherein the power supply supplies an alternating voltage, and the control unit controls the switches such that, within at least one setting, the electrodes are energised only during each Nth half-cycle of the alternating voltage, where N is at least 2.

9. The liquid heater as claimed in claim 1, wherein the power supply supplies an alternating voltage, and the control unit controls the switches such that, within at least one setting, the electrodes are energised during one or more portions only of each half-cycle of the alternating voltage.

10. The liquid heater as claimed in claim 1, wherein the liquid heater comprises a temperature sensor for sensing a temperature of the liquid, and the control unit controls the switches so as to select an electrode configuration based on the temperature of the liquid and a temperature setpoint.

11. The liquid heater as claimed in claim 1, wherein the liquid heater comprises a temperature sensor for sensing a temperature of the liquid, and the control unit controls the switches such that the electrodes are energised with a voltage having a duty defined by the temperature of the liquid and a temperature setpoint.

12. The liquid heater as claimed in claim 1, wherein the control unit controls the switches such that the electrodes are energised with a voltage having a variable duty no less than 70%.

13. The liquid heater as claimed in claim 1, wherein the power supply supplies an alternating voltage, and the switches are bi-directional switches.

14. The liquid heater as claimed in claim 1, wherein the power supply supplies an alternating voltage having a first frequency, and the control unit controls the switches such that the electrodes are energised with an alternating voltage having a second higher frequency.

15. The liquid heater as claimed in claim 14, wherein the first frequency is no greater than 60 Hz and second frequency is no less than 150 KHz.

\* \* \* \* \*